United States Patent [19]

Mathieu et al.

[11] Patent Number: 5,843,543
[45] Date of Patent: Dec. 1, 1998

[54] STRUCTURE WITH A CONVEX AXISYMMETRIC SURFACE

[75] Inventors: Gérard Mathieu, Toulouse; François Monget, Merignac, both of France

[73] Assignee: Aerospatiale Societe Nationale Industrielle, Paris Cedex, France

[21] Appl. No.: 692,624

[22] Filed: Aug. 6, 1996

Related U.S. Application Data

[60] Continuation of Ser. No. 454,857, May 31, 1995, abandoned, which is a division of Ser. No. 130,723, Oct. 4, 1993, Pat. No. 5,441,584.

[30] Foreign Application Priority Data

Oct. 15, 1992 [FR] France .................................. 92 12617

[51] Int. Cl.$^6$ ................................................. B29D 22/00
[52] U.S. Cl. ........................ 428/36.3; 220/589; 220/590; 428/36.9
[58] Field of Search ................... 428/36.3, 36.9; 220/589, 590

[56] References Cited

U.S. PATENT DOCUMENTS

| | | | |
|---|---|---|---|
| 2,901,190 | 8/1959 | Wentz | 156/170 |
| 3,005,256 | 10/1961 | Young | 220/589 |
| 3,083,864 | 4/1963 | Young | 220/590 |
| 3,140,058 | 7/1964 | Courtney | 156/175 |
| 3,356,120 | 12/1967 | Nohmura | 220/414 |
| 3,443,765 | 5/1969 | Jube et al. | 156/175 |
| 4,053,081 | 10/1977 | Minke . | |
| 4,080,915 | 3/1978 | Bompard et al. | 242/7.21 |
| 4,366,658 | 1/1983 | Maistre . | |
| 4,529,139 | 7/1985 | Smith et al. | 156/175 |
| 4,863,660 | 9/1989 | Cahuzac et al. | 156/173 |
| 5,441,584 | 8/1995 | Mathieu et al. | 156/175 |

FOREIGN PATENT DOCUMENTS

| | | | |
|---|---|---|---|
| 741150 | 8/1966 | Canada | 220/590 |
| 785600 | 5/1968 | Canada | 156/189 |
| 0032858 | 7/1981 | European Pat. Off. . | |
| 1414309 | 9/1965 | France . | |
| 2038524 | 1/1971 | France . | |
| 2575966 | 7/1986 | France . | |
| 2612950 | 9/1988 | France . | |
| 1235777 | 3/1967 | Germany . | |
| 2746290 | 4/1979 | Germany | 156/161 |
| 4723812 | 7/1972 | Japan | 220/590 |
| 2-52728 | 2/1990 | Japan . | |
| 252728 | 2/1990 | Japan | 156/173 |
| 1064590 | 4/1967 | United Kingdom . | |

*Primary Examiner*—James J. Bell
*Attorney, Agent, or Firm*—Young & Thompson

[57] ABSTRACT

A structure obtained by laying filaments on a convex axisymmetric surface to provide a hemispherical surface. The structure may include with a circular hole or a dead zone centered on an axis of the surface and may be formed by laying filaments along a geodesic path. The structure includes a first and second part, in which the first part includes the axis. The geodesic path formed by the filaments on the first part may be spaced a predetermined distance the opening or circular dead zone.

11 Claims, 4 Drawing Sheets

STRUCTURE WITH A CONVEX AXISYMMETRIC SURFACE

This application is a continuation of application Ser. No. 08/454,857, filed May 31, 1995, and now abandoned, which is a divisional of application Ser. No. 08/130,723, filed Oct. 4, 1993, now U.S. Pat. No. 5,441,584.

BACKGROUND OF THE INVENTION

1. Field of the Invention

The present invention concerns the provision of bulged structures constituted by a casing with in particular a hemispherical shape and externally covered with resistant fibers possibly bound together by a settable binder.

The invention applies more specifically, but not exclusively, to the provision of storage vessels for fluids under pressure and in particular vessels known as gas storage "bottles", these gases being air, oxygen, nitrogen, carbonic acid used in various industrial sectors.

2. Discussion of Background Information

This type of vessel comprises a central cylindrical hoop provided with bulged end portions, generally hemispheric, the entire structure being reinforced by means of resistant fibers bound together by a settable binder.

One of the end portions comprises at its central portion a passage hole so that the reinforcement of the bottle end portions is embodied by making a reserve on the top portion of the two hemispheres of the end portions.

The current technique for filament laying used for embodying such a structure consists of a simple winding with an elementary pattern during which the filament to be laid passes only once on the hemispherical cap, the passage being uninterruptedly repeated with a slight angular shift as many times as there are filaments on the layer.

The drawback of this technique resides in the filament accumulating at the periphery of the hole of one of the end portions and the dead zone corresponding to the other end portion, the filament thus forming a "bulb", which does not provide a constant thickness when reinforcing these end portions of the bottles.

SUMMARY OF THE INVENTION

One object of the invention is to overcome the above discussed drawbacks by proposing a new technique for laying filaments on bulged surfaces and in particular spherical surfaces, so as to embody structures of the bottle type as defined above, or, generally speaking, any structure constituted by an alement whose external surface exhibits a convex axisymmetrical geometry and comprises, in the zone of the axis of symmetry, a hole or dead zone centered on the axis, which must not be covered. Such a structure may, for example, constitute a front element resisting thermomechanical stresses for affording thermic protection against bodies entering the atmosphere, or one portion of a larger structure.

The object of the invention is to provide a method for laying filaments on a convex axisymmetric surface, in particular hemispherical surface, provided with a hole or a circular dead zone, centered on the pole, wherein:

a reference circle is defined and is parallel to the external edge of the surface and situated at a specific distance from the plane of the edge, a regular series of points is defined on the reference circle, a filament or a set of filaments are laid along a first approximately geodesic path on the surface from the external edge up to a first point, so-called departure point, of the reference circle, laying of the filament from the departure point up to a second point, so-called arrival point, of the reference circle, along a second path, also approximately geodesic, laying of the filament beyond the arrival point up to the external edge along a third approximately geodesic path, the same laying process is repeated by passing through a second departure point and through a second arrival point, both points being on the circle, repeating such laying as many times as possible without any crossing, at least in the area close to said hole or dead zone, of the filaments being laid, so as to lay a set of filaments, so-called a lap, then repeating the same lap laying process with successive shifts until each point of the reference circle is, at the same time and once only, a departure point and an arrival point so as to obtain one layer, and the process is possibly restarted until the desired thickness is obtained.

Such a method makes it possible to carry out on the convex axisymmetric surface a geodesic laying of filaments with a roughly constant thickness from the hole or dead zone up to the vicinity of the inflection circle of the filaments path defined by the departure and arrival points.

During laying such a so-called lap, the filaments may all be laid on the same side of the hole or the dead zone or on both sides of the latter, this second way of laying allowing for better distribution of the excess thicknesses due to the intersection of filaments of the superimposed laps.

It is also possible to have the laying pattern of laps vary, the laps constituting a layer in the sense defined earlier, from one layer to the next, so as to obtain a progressive thickness profile.

Between two superimposed layers or between each layer, it is also possible to carry out a filament laying by a simple winding operation as stated in the preamble.

Similarly, laying according to the invention may be completed by a stitching introducing filaments along a thud direction locally orthogonal with respect to the laying directions according to the invention.

Another object of the invention is also to provide a device for implementing the above mentioned method, wherein it comprises a set of needles or the like implanted projecting onto the surface to be covered along the reference circle, preferably at an equal distance from one another and defining the departure and arrival points between which the filament or the set of filaments is laid geodesically with the aid of a known-type of winding machine.

Finally, the invention concerns any structure wound in accordance with the invention.

BRIEF DESCRIPTION OF THE DRAWINGS

Other characteristics and advantages of the technique of the invention shall be more readily understood from a reading of the following description of an embodiment for implementing the method defined above, this description being given solely by way of example and with reference to the accompanying drawings in which.

DETAILED DESCRIPTION OF THE PREFERRED EMBODIMENTS

Figure 1:
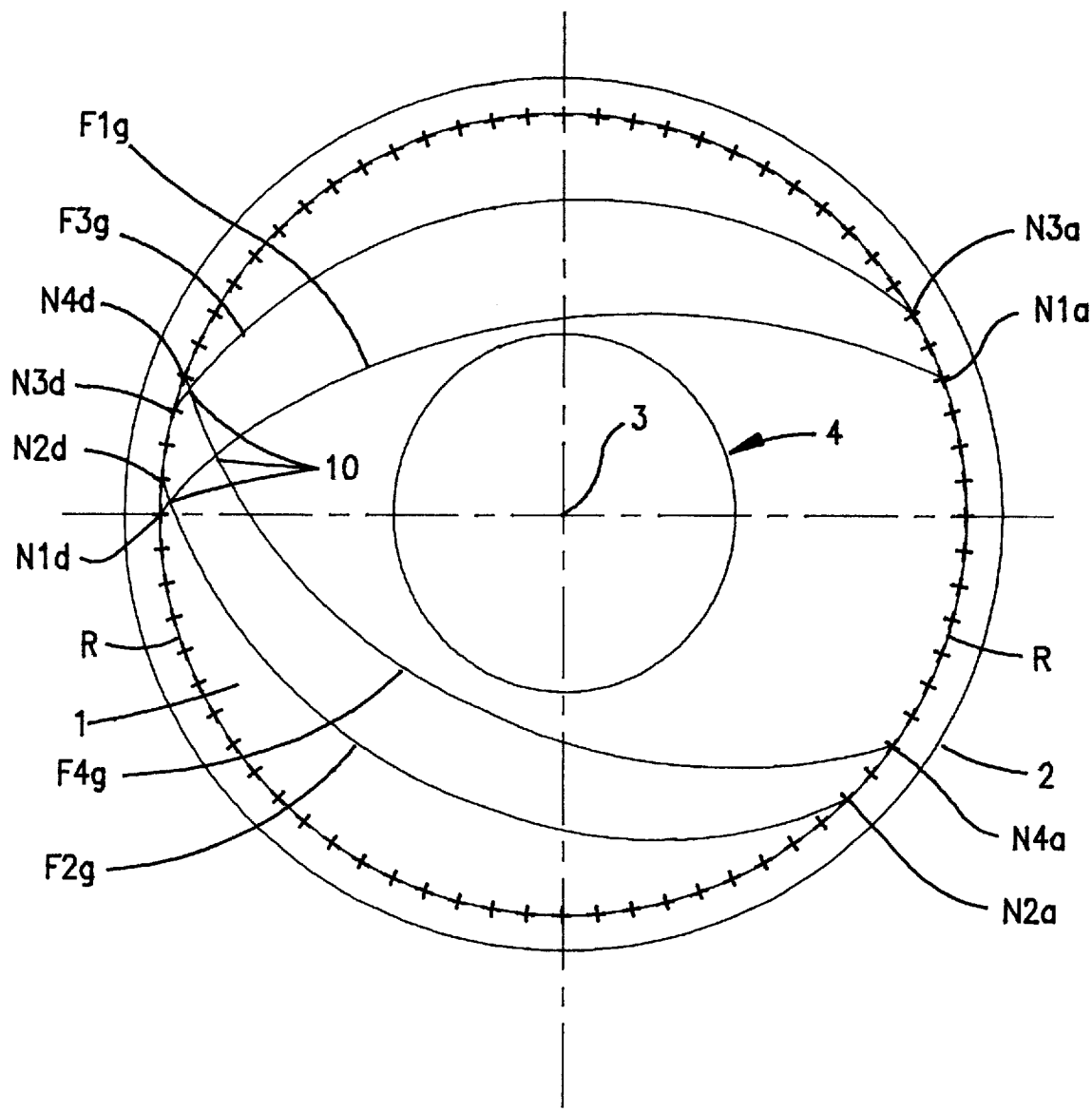
FIG. 1 is an end view of a hemispherical surface wound with a first lap laid in accordance with a carrying-out of the method of the invention.
Figure 2:
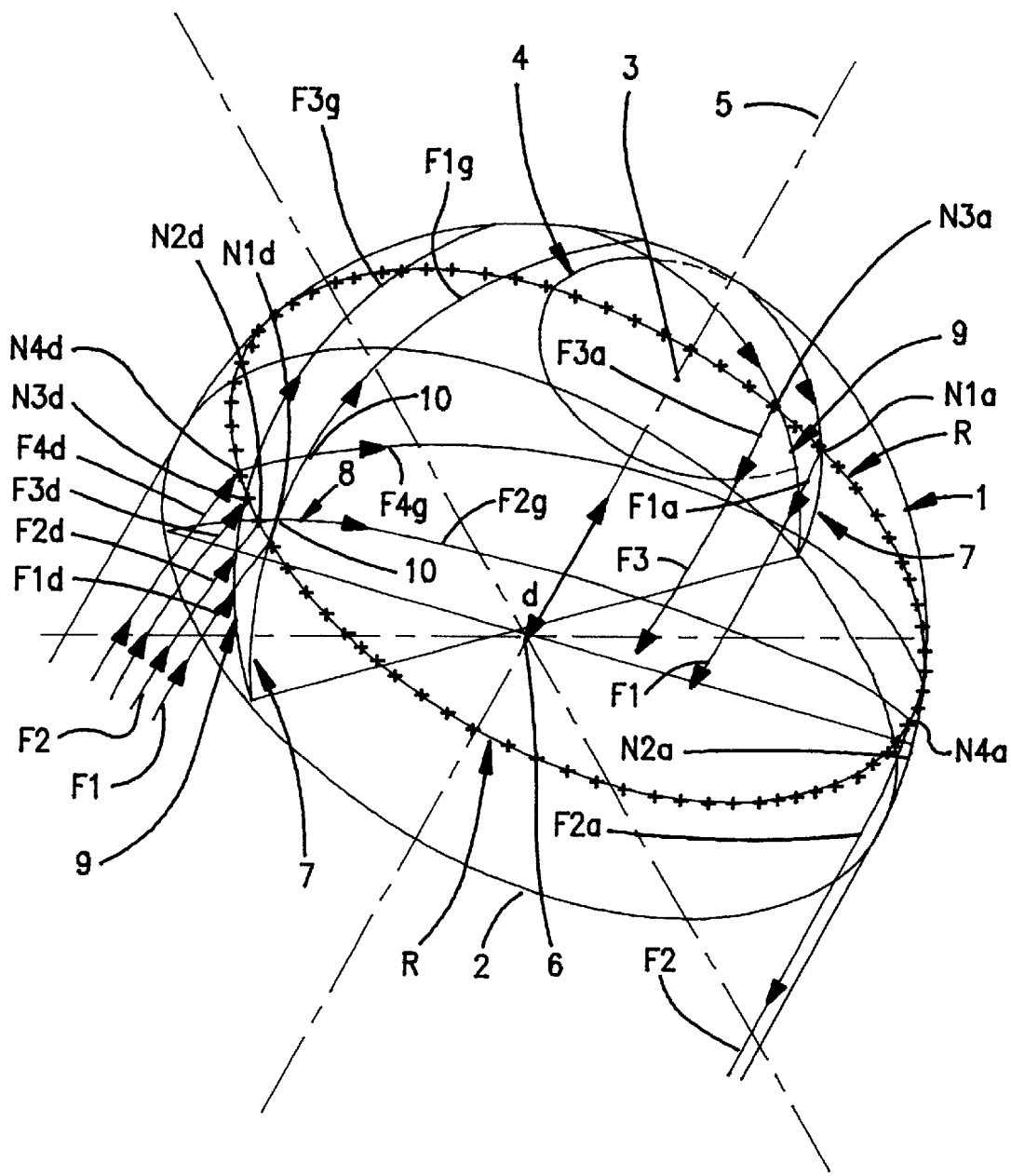
FIG. 2 is a perspective view of the surface of FIG. 1.

Shown in FIGS. 1 to 4 are: at 1, a hemispherical surface with its external edge materialized by the greater circle 2, its pole 3, a hole or circular dead zone 4 centered on the pole 3 and which must not be covered, the axis 5 passing through the pole 3 and the center 6 of the hemispherical surface 1.

A filament formed of several continuous and grouped filaments is laid onto the hemispherical surface 1 by successive passages.

The first passage is denoted by F1, the filament being represented on the greater circle 2 approximately along a generating line of the cylinder extending the hemisphere 1.

According to the method of the invention, the filament F1 is laid an the surface 1 approximately along a meridian (section F1$d$) up to a point N1$d$, so-called the first departure point belonging to the lap N1, and situated on a circle R known as the reference circle defined by the intersection of the surface 1 with a plane parallel to the greater circle 2 and situated at a distance d from the greater circle plane.

From the point N1$d$, the filament F1 is laid (section F1$g$) on the cap delimited by the circle R along an arc of a great circle 7 of the surface 1 up to an arrival point N1$a$ of the circle R, which is determined so that the section F1$g$, the reference g indicating that it concerns a geodesic laying, is tangent to the hole or circle 4 or not far from the latter.

Between the circle R and the greater circle 2, the filament F1 is laid approximately along a meridian of the surface 1 (section F1$a$) and then beyond the greater circle 2, the filament F1 is approximately parallel to the axis 5.

During the next passage F2 of the filament, the latter is laid approximately along a meridian (section F2$d$) between the greater circle 2 and the circle R up to a point N2$d$ of the latter situated close to the point N1$d$.

From the point N2$d$, the filament F2 is laid (section F2$g$) on the cap delimited by the circle R along an arc of a great circle 8 of the surface up to an arrival point N2$a$ of the circle R.

Beyond the point N2$a$, the filament is laid approximately along a meridian (section F2$a$) up to the greater circle 2 and next the filament F2 is approximately parallel to the axis 5. It is to be noted that in the embodiment illustrated by FIGS. 1 to 4, the arrival point N2$a$ selected for the filament F2 is, with respect to a plane containing the axis 5 and the section F2$d$, on the side opposite the point N2$a$, so that the section F2$g$ goes round the hole or circle 4 via the other side with respect to the section F1$g$.

Moreover, the location of the point N2$a$ on the circle R is selected so as to approximately distance the filament section F2$g$ from the hole or circle 4.

Furthermore, the location of the point N2$a$ on the circle R is selected so as to distance the filament section F2$g$ considerably from the hole or circle 4.

Another point could of course be selected, for example, to bring the section F2$g$ closer to the hole or circle 4.

During the third passage of the filament (73), the latter is laid, as in the other massages, approximately along a meridian (F3$d$) up to a departure point N3$d$ on the circle R.

Beyond the circle R, the filament is laid along an arc of a great circle 9 (section F3$g$) up to a point N3$a$ of the circle R situated at a distance from the point N1$a$ equal to that between the points N1$d$ and N3$d$ and on the side of the circle R not making the sections F1$g$ and F3$g$ intersect with each other.

Beyond the point N3$a$, the filament approximately follows a meridian (section F3$a$) as for the preceding passages.

In the embodiment shown in FIGS. 1 to 4, the laying of the section F3$g$ is symmetrical with that of the laying of the section F2$g$ with respect to a plane containing the axis 5 and passing at an equal distance from the points N2$d$ and N3$d$.

Finally, during the fourth passage (filament F4), the same process is continued with a departure point N4$d$ and an arrival point N4$a$ on the circle R, the geodesic laying section F4$g$ being disposed symmetrically to the section F1$g$ with respect to the plane defined above.

The sections F1$g$ to F4$g$ constitute a lap, that is a set of filaments able to be laid on the spherical cap delimited by the circle R without the filaments intersecting, at least in the cap zone closest to the hole or circle 4. If in the illustration given on the figures, the sections F1$g$ to F4$g$ cross at 10, this occurs in a strip of the cap close to the circle R.

A lap preferably shall contain the maximum number of filaments able to be laid geodesically without crossing on the zone close to the hole or circle 4.

The departure points N1$d$ to N4$d$ and the arrival points N1$a$ to N4$a$ form part of a series of points evenly distributed along the circle R and whose number is preferably a multiple of the number of filaments per lap.

In the embodiment shown, the circle R is divided into seventy-two points.

Considering that a layer shall be obtained when each of the seventy-two points (N1$d$, N2$d$, N3$d$, N4$d$, etc) shall have been taken, successively and up to the return to the original point N1$d$, as a departure point of laying, it is then necessary to lay eighteen laps, such as the lap N1 containing the sections F1$g$ to F4$g$.

Figure 3:
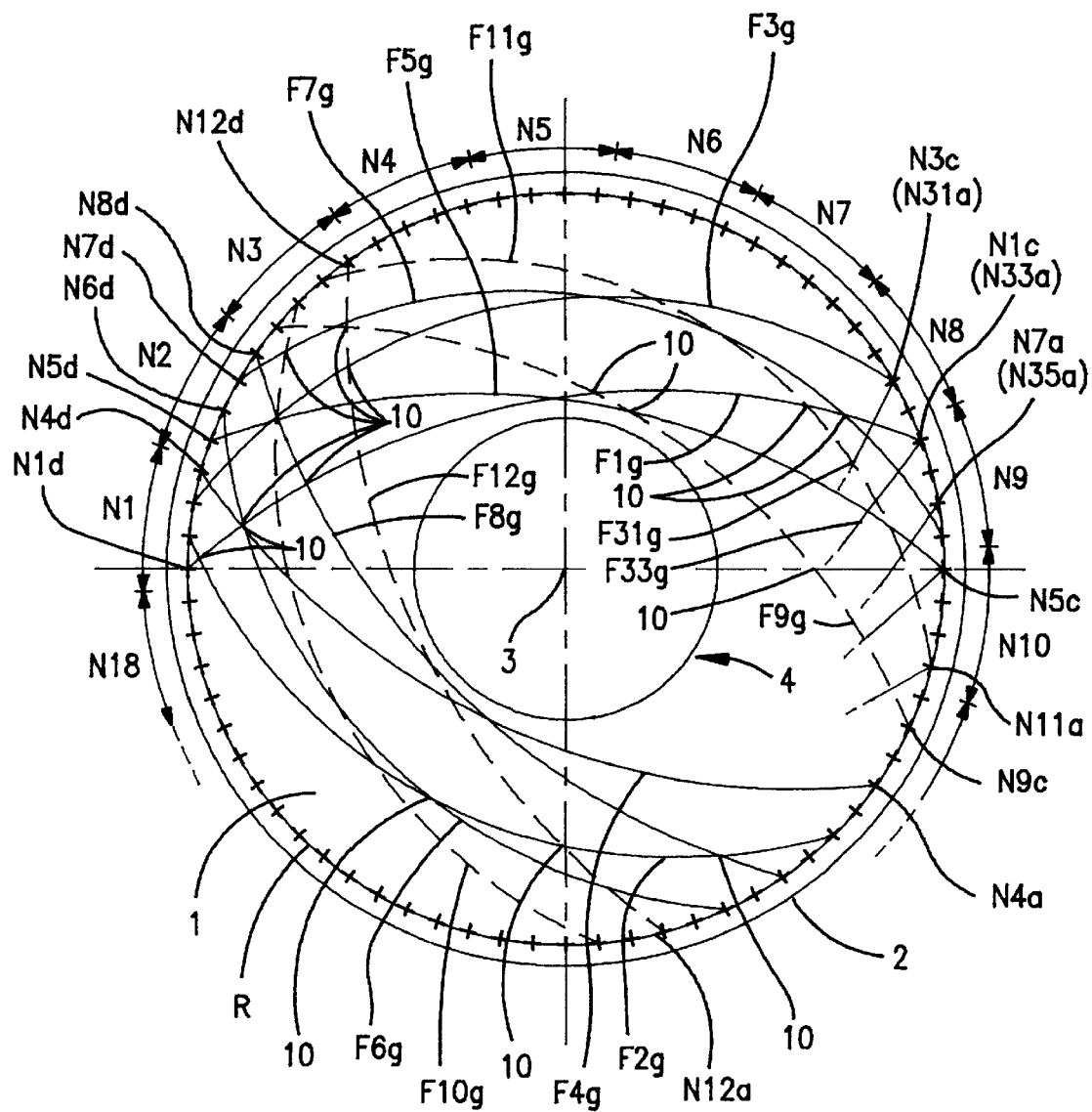
FIG. 3 shows the surface of FIG. 1 wound with three laps.
Figure 4:
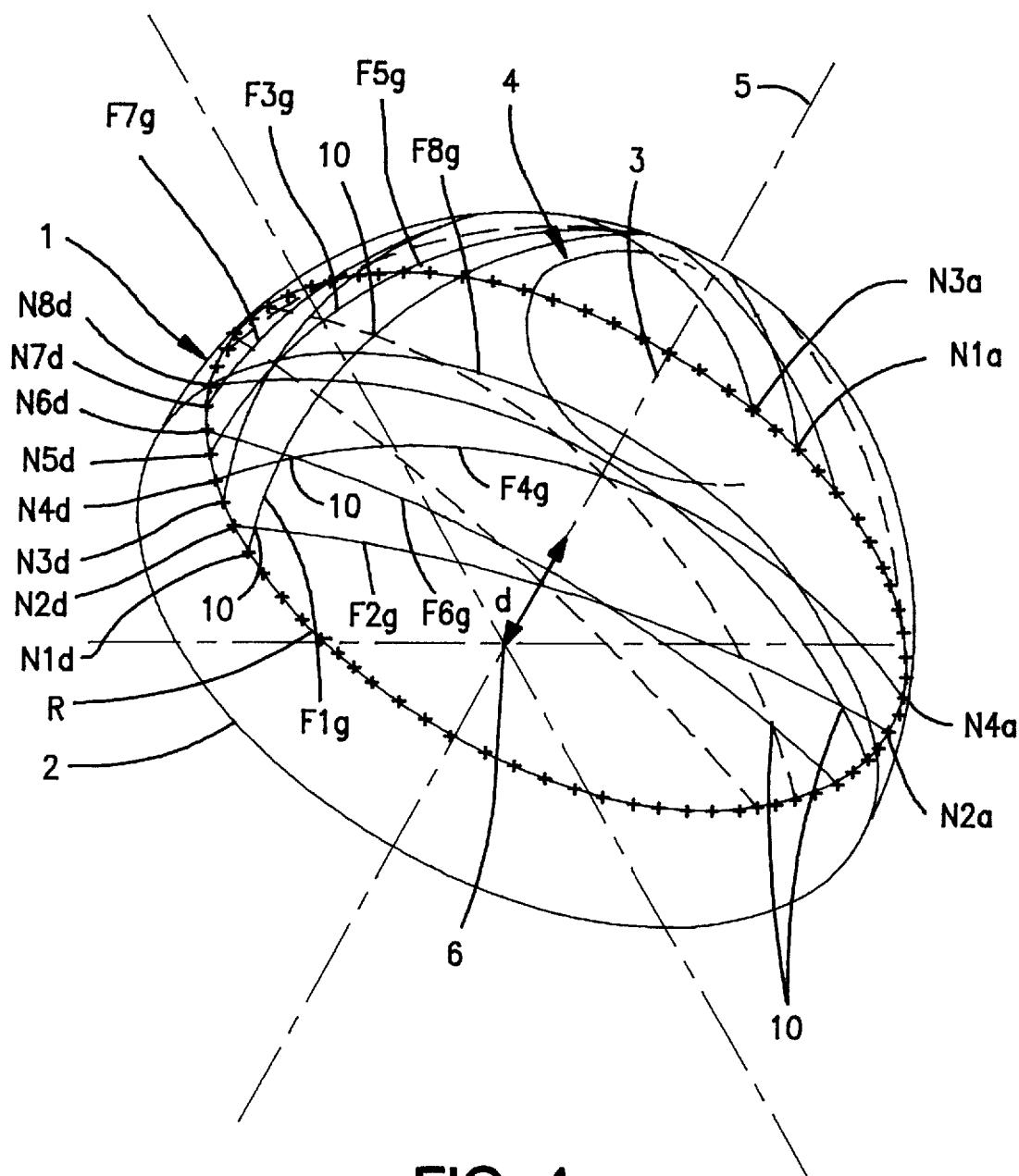
FIG. 4 is a perspective view of the surface of FIG. 3.

FIG. 3 shows the first nine laps N1 to N9 identified by their departure points on the circle R and which cover half of the circle R. It is to be noted that, as regards the laps NS and N9, some of the departure points shall be merged with the arrival points of the laps N1 and N2. This is the case, for example, of the departure points N31$d$, N33$d$ and N35$d$ which are respectively merged with the arrival points N3$a$, N1$a$ and N7$a$.

At these points, both as regards departure and arrival, the two filaments of the sections laid on the cap are placed, one being on one side of the hole or circle 4, and the other on the other side, as shown for example on FIG. 3 by the sections F3$g$, F31$g$ and F1$g$, F33$g$.

Similarly, some of the filaments laid on the cap from the departure points of the laps N8, N9 reach arrival points which are merged with some of the points N1$d$ to N8$d$, the filaments in question being at these points also disposed in opposition with the filament sections F1$g$ to F8$g$ with respect to the hole or circle 4.

Once the laps N10 to N18 have been placed so as to form a layer as defined above, all the points of the circle R will be, at the same time and for once only, the departure point and the arrival point.

The successive laps N1 to N18 are preferably laid according to the same pattern, the filaments as regards each lap being placed on both sides of the hole or circle 4, as illustrated for example by the sections F5$g$, F7$g$ and F6$g$, F8$g$ for the lap N2 and by the sections F9$g$, F11$g$ and F10$g$, F12$g$ for the lap N3.

This layer exhibits no annular bulb near the hole or circle 4, since the laying method allows for distribution of the intersections 10 of the filaments over the entire extent of the covered spherical cap, as can be seen on FIG. 3.

Thus, not only the laying of the filaments on the cap is geodesic, which ensures good filament stability, but the intersections of the filaments are distributed regularly on a wide surface, thus providing the layer with a more regular thickness.

The desired thickness of the covering at the right of the spherical surface 1 is obtained by carrying out an appropriate number of layers.

As regards each lap of four filaments (F1g to F4g; F5g to F8g; F9g to F12g), instead of carrying out an alternate laying of two filaments on one side of the hole 4 and two on the other, the four filaments could be laid on the same side of the hole or circle 4, still following arcs of a great circle.

The alternate laying as illustrated makes it possible to obtain a thicker layer and a more regular fibered structure but less dense, since more filament crossings are obtained than with a laying on the same side of the hole or circle 4.

Moreover, in a given lap, it is possible to not strictly follow the ascending order of the points defined on the circle R and lay, for example, the filaments of the lap N1 by beginning with any of the four departure points N1d to N4d, and then during the second passage, by passing through any one of the three remaining departure points and so on.

Advantageously, the various layers shall be embodied with a mutual angular shift so as to homogenize the fibered structure.

This mutual shift is for example obtained by taking as a first departure point of the first lap of the second layer, no longer the point N1d of FIGS. 1 to 4, but the point immediately following N2d. This avoids superimposing the laps of a given row from one layer to the next one.

This shift may also be obtained by reversing the laying direction of the laps of the following layer, i.e. by starting in an anticlockwise direction on the circle R, whereas in the method shown in FIGS. 1 to 4, the laying of successive laps N1 to N18 is carried out in a clockwise direction along the circle R.

The laying pattern of the laps of each layer may be possibly changed so as to obtain the desired thickness profile.

In addition, a conventional interlayer winding may be embodied and similarly, in accordance with the instructions of the document FR-2,612,950 in the name of the assignee, to carry out, for example, the insertion of a filament into the thickness (third direction) of the fibered structure by means of stitching.

The distance d between the planes of circle R and the greater circle 2 may vary. However, it must not be too small, since this would result in a tendency for a concentration of filament intersections in an annular strip close to the circle R. The distance d must also not be too large, as this would result in increasing the annular zone between the circle R and the greater circle 2, covered with the filaments laid along meridians.

The change of direction or inflection of the path of the filaments at the levels of the departure and arrival points on the circle R is carried out, for example, with the aid of pins radially implanted in the surface 1 at the level of points N1d, N2d; N1a,N2a.

These pins make it possible to easily lay a filament on either side of each needle so as to provide the filament with the desired direction on either side of the hole or circle 4.

This technique for implanting needles and winding from such a set of needles is well known in itself and is illustrated, for example, by the above mentioned document FR-2,612, 950.

After the filaments are placed, the pins are removed or left in place. Fuse pins my also be used.

In the above mentioned laying example, so as to render understanding easier, the departure and arrival points on the reference circle have been defined, but it is clear that a reverse laying could have been effected, i.e., by starting from the aforenamed arrival points on the circle R and distanced from each other so as to reach the aforenamed departure points and disposed subsequently.

The method of the invention makes it possible to manufacture "bottles" as defined earlier comprising a central hoop and two hemispherical end portions, each comprising a circular covering reserve centered on the pole and corresponding, as regards one of the end portions, to the opening of the bottle.

Both end portions exhibit a roughly constant thickness along one meridian without any bulb on the periphery of the central reserve.

The hoop and the two end portions are advantageously wound at the same time with the filament being laid on the end portions according to the invention and defining one or several filament layers laid longitudinally on the hoop so as to constitute a weft insertion which is then recovered with a circumferential winding from the same filament solely at the right of the hoop.

Generally speaking, the method of the invention makes it possible to cover any convex axisymmetric surface, regardless of the nature and the destination of the covered object and irrespective of whether it forms a whole in itself or is a part of a larger object.

Finally, the invention is of course not restricted to the methods of embodiments represented and described above, but on the contrary, covers all possible variants, especially as regards the number of filaments laid per lap, the laying method, alternate or otherwise, the filaments of a given lap, the number of laps for forming a covering layer as defined earlier, the number and laying pattern of the laps forming a layer, as well as the nature of means able to change the laying direction of the filaments at the level of the reference circle R.

The filament used, made up of a number of longitudinal filaments, may be glass, carbon, "kevlar", alumina or boron fibers, etc, possibly preimpregnated.

Moreover, it is to be noted that each filament may be constituted by a set of filaments in the form of a ribbon strip or strand.

The fibered structure thus laid may then be impregnated, densified, etc.

We claim:

1. A structure comprising:
    at least one convex axisymmetric surface including at least one of a circular opening and a circular dead zone centered on an axis of said convex axisymmetric surface;
    said convex axisymmetric surface comprising a casing covered by filaments bound by a settable binder, said filaments including one of single filaments and sets of filaments;
    said convex axisymmetric surface including a first and second part defined by a circle, said circle including a center positioned on said axis of said convex axisymmetric structure, said first part including said axis;

said filaments laid onto said first part along geodesic paths at a variable spacing from said at least one of the opening or the circular dead zone and laid onto said second part along geodesic paths so that said filaments cross each other; and said at least one of the opening or the dead zone not being covered by said filaments.

2. A structure according to claim 1, wherein said filaments are laid onto said first and second part to form at least one layer, said layer including several laps of said filaments.

3. A structure according to claim 2, wherein said filaments of each of said several laps are laid on both sides of said at least one of an opening and a circular dead zone.

4. A structure according to claim 2, wherein said filaments of each of said several laps are laid on one side of said at least one of an opening and a circular dead zone.

5. A structure according to claim 3, wherein each of said several laps within a layer include varying filament laying patterns.

6. A structure according to claim 4, wherein each of said several laps within a layer include varying filament laying patterns.

7. A structure according to claim 1, further comprising an interlayer winding comprising a third filament stitched along a predetermined direction.

8. A structure according to claim 1, wherein said at least one convex axisymmetric surface comprises a hemispherical surface.

9. A structure according to claim 1, comprising a cylindrical portion and a first and second hemispherical end portion, said first hemispherical end portion including said opening and said second hemispherical end portion including said circular dead zone corresponding to said opening.

10. A structure according to claim 1, wherein said structure comprises a storage vessel for fluids under pressure.

11. A structure according to claim 1, wherein said filaments comprise a covering having a substantially constant thickness.

* * * * *